United States Patent [19]

Martin

[11] 3,815,437
[45] June 11, 1974

[54] ENERGY ABSORBING STEERING COLUMN ASSEMBLY
[75] Inventor: John A. Martin, Southend-on-Sea, England
[73] Assignee: Ford Motor Company, Dearborn, Mich.
[22] Filed: Apr. 12, 1973
[21] Appl. No.: 350,436

Related U.S. Application Data
[63] Continuation of Ser. No. 169,397, Aug. 5, 1971, abandoned.

[52] U.S. Cl. .............................................. 74/492
[51] Int. Cl. .......................................... B62d 1/18
[58] Field of Search ............... 71/492, 493; 188/1 C

[56] References Cited
UNITED STATES PATENTS
3,412,628  11/1968  De Gain ............................. 74/492
3,415,140  12/1968  Bien et al. .......................... 74/492
3,424,263  1/1969   Black ................................. 74/492 X
3,577,621  5/1971   De Gain ............................. 74/492 X
3,707,096  12/1972  Bennett ............................. 74/492

Primary Examiner—Allan D. Herrmann
Attorney, Agent, or Firm—Clifford L. Sadler; Keith L. Zerschling

[57] ABSTRACT

An energy absorbing steering column assembly in accordance with one preferred embodiment of this invention includes a forward pedal supporting section for the clutch and brake pedals, a corrugated intermediate energy absorbing section and a rearward steering shaft support section releasably connected to the instrument panel. The intermediate energy absorbing section is of channel shape and has three corrugated walls.

12 Claims, 7 Drawing Figures

PATENTED JUN 11 1974 3,815,437

INVENTOR.
ANTHONY JOHN MARTIN
BY *Keith L. Zerschling*
*Clifford L. Sadler*
ATTORNEYS

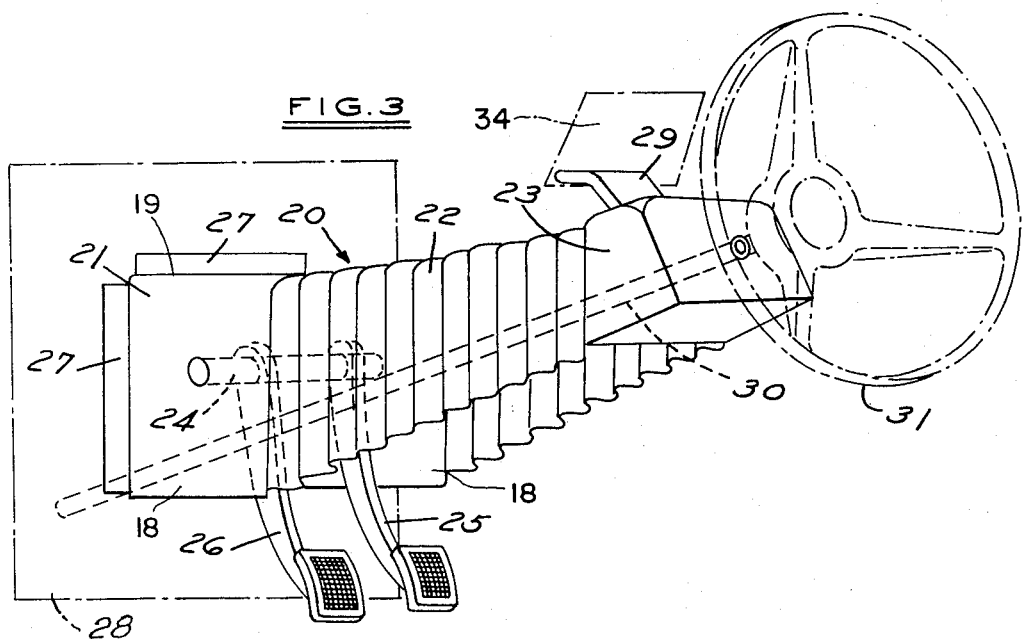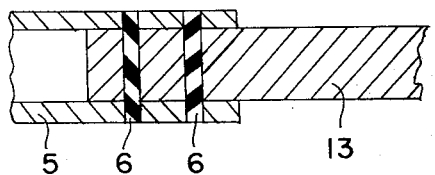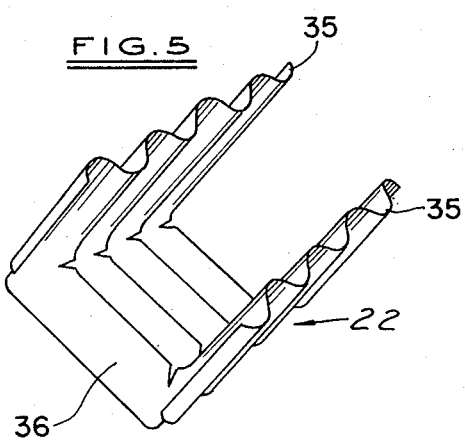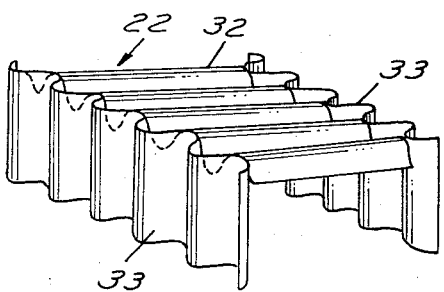

3,815,437

ENERGY ABSORBING STEERING COLUMN ASSEMBLY

This is a continuation of application Ser. No. 169,397, filed Aug. 5, 1971, and now abandoned.

BACKGROUND AND SUMMARY OF THE INVENTION

This invention relates to steering shaft support assemblies in which the steering wheel is supported by a structure arranged to collapse with accompanying absorption of energy if an impact load is exerted against the steering wheel.

Energy absorbing structures for use in steering assemblies are now well known and extensively used. The present invention provides a steering assembly which may have superior performance characteristics under certain operating and collapsing conditions.

According to one presently preferred embodiment of the invention, a motor vehicle has the following features:

a. clutch and brake pedals depending from a bearing in a pedal support structure;
b. the forward end of the pedal support structure is fixed to a body member of the vehicle such as the dash or fire wall;
c. a collapsible steering shaft extends through the pedal support structure;
d. the steering shaft is connected to or supported by the rear end of the pedal support structure;
e. a steering wheel is fixed to the steering shaft; and
f. the pedal support structure is so constructed that in the event an impact load is exerted against the steering wheel, plastic deformation and collapse of the pedal support structure takes place and at least part of the energy of such impact is absorbed in the pedal support structure.

In accordance with an alternate presently preferred embodiment of the invention, a motor vehicle has the following features:

a. a combined pedal and steering shaft support structure is fixed at its forward end to vehicle body structure such as the fire wall and releasably connected adjacent its rearward end to the instrument panel;
b. clutch and brake pedals are mounted in a forward section of the support structure;
c. a steering shaft is supported by a rearward section of the support structure;
d. a steering wheel is fixed to the rearward end of the steering shaft; and
e. an intermediate section of the support structure is constructed to collapse and deform in the event of an impact upon the steering wheel to thereby absorb the energy of such impact.

BRIEF DESCRIPTION OF THE DRAWINGS

The many objects and advantages of a steering assembly constructed in accordance with this invention will become apparent from the following detailed description and the accompanying drawings, in which:

FIG. 3 is a perspective view of a pedal and steering shaft support structure embodying an alternate construction of the invention;

FIG. 5 is a perspective view showing the construction of the collapsible intermediate section of the pedal and steering shaft support structure of FIG. 3;

FIG. 6 is a perspective view showing an alternate construction of the collapsible intermediate section shown in FIG. 5; and FIG. 7 is a sectional view of a portion of the upper and lower steering shaft sections.

DETAILED DESCRIPTION OF THE PREFERRED EMBODIMENTS

Figure 1:
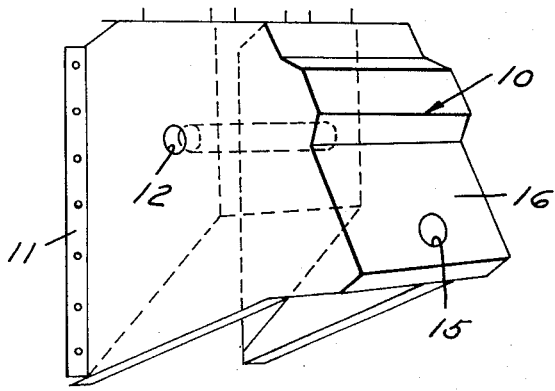
FIG. 1 is a perspective view of a pedal box structure for use in a steering column assembly embodying the invention.
Figure 2:
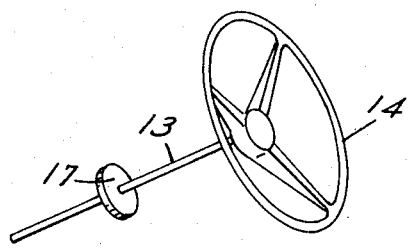
FIG. 2 is a perspective view of a steering wheel and upper steering shaft for use with the pedal box structure of FIG. 1.

Referring now to the drawings for a more complete understanding of the present invention, FIGS. 1 and 2 show a first construction of a pedal and steering shaft support. A pedal box structure 10 is fixed by flanges 11 to the lower dash panel or fire wall of motor vehicle body structure. Clutch and brake pedals (not shown) depend from a pedal bearing member that extends through apertures 12 in the sides of the pedal box structure.

An upper steering shaft 13 has a steering wheel 14 fixed to its rearward end and a forward end that extends through an aperture 15 in a rear wall 16 of the pedal box structure 10. An impact disc 17 is fixed to the upper steering shaft 13 and is located behind the pedal box structure 10 adjacent to the rear wall 16 when the pedal box structure and steering shaft are installed in the vehicle.

A lower steering shaft 5 connects the upper steering shaft 13 to a steering gear box. The upper and lower steering shafts together form an axially collapsible assembly. Such axial collapse may be achieved by using a rigid lower shaft connected to the upper shaft 13 by shear pins or by using a flexible cable for the lower shaft.

The upper end of the upper shaft is supported by a bracket (not shown) secured beneath the upper dash or instrument panel of the vehicle body structure.

In the event of an impact upon the steering wheel 14, the steering shaft 13 will be forced forward. The impact disc 17 will be forced against the pedal box structure 10 which collapses with plastic deformation and concomitant absorption of the energy of the impact.

In the embodiment of FIG. 3, a combination pedal and steering shaft support structure 20 comprises a forward supporting pedal section 21, a corrugated collapsible intermediate section 22 and a rearward steering shaft support section 23. The forward section 21 includes pivot means constructed to support at least one of the operating control pedals of the vehicle. The forward pedal supporting section 21 is of inverted channel shape with substantially flat side walls 18 and interconnecting wall 19 that carry a pedal shaft 24 from which brake and clutch pedals 25 and 26 depend. Flanges 27 are formed at the forward edges of the pedal supporting section 21 for fixing the total structure 20 to a lower dash panel or fire wall 28 of a motor vehicle body structure.

The rearward steering shaft support section 23 is a reinforced box structure within which is fixed an upper steering shaft bearing (not shown). Releasable means is provided for connecting the section 23 to vehicle body structure. A break-away bracket 29 is affixed to the rearward steering shaft support structure 23 and secures it to an upper dash panel 34 or instrument panel of the vehicle body structure. The break-away bracket is designed to yield at a predetermined force to allow the steering column assembly to collapse. Another suitable bracket is described, for example, in U.S. Pat. No. 3,621,732.

A collapsible steering shaft 30 is mounted at its upper end in the bearing within the rearward steering shaft support section 23 and extends forwardly within the combined pedal and steering shaft support structure 20 to a steering gear (not shown). The steering wheel 31 is fixed to the upper end of the steering shaft 30. The steering shaft 30 may be a telescopic or collapsible assembly of rigid upper and lower sections (such as shown in FIG. 7) or a flexible cable may be used for the lower part of the shaft.

The steering shaft support section 23 may also house a direction indicator switch and an ignition and steering column lock.

The intermediate section 22 of the combined pedal and steering shaft support structure 20 is designed to collapse substantially uniformly under impact. The preferred construction of the intermediate section 22 is illustrated in FIG. 5. The intermediate section 22 includes side wall 35 and an interconnecting top wall 36. It is formed by pressing sheet metal into an inverted channel section with transverse corrugations. The inner corrugations are pierced or apertured at the corners of the channel to weaken the corners so that during collapse of the structure, no undesirable skew forces are produced. It will be appreciated that in the absence of such weakening, the corners would have a greater resistance to collapse than the side walls and the steering wheel and steering shaft section 23 would be displaced downwardly from the optimum direction of movement.

The lower edges of the pair of side walls 35 of the intermediate section 22 are spaced apart and, in part, define an access opening exposing a portion of the steering shaft 30 whereby the shaft may be inspected and repaired if necessary.

It is an inherent advantage of the construction of the intermediate section 22 that wide variations in design parameters (such as dimensions, pitch of the corrugations, material specification, and gauge of material) are possible in order to achieve any desired characteristics of resistance to collapse. The response of this structure when an impact load is exerted against the steering wheel, including loads inclined to the axis of the steering shaft, can be controlled by the selection of the design parameters.

The forward pedal supporting section 21, the intermediate section 22 and at least part of the steering shaft support section 23 are preferably made by pressing from a single sheet of metal. The structure may alternately be fabricated from a number of separate parts that are welded together.

FIG. 6 illustrates a fabricated intermediate section 22 in which separate corrugated side walls 33 and a top wall 32 are welded together to form an inverted channel section.

Figure 4:
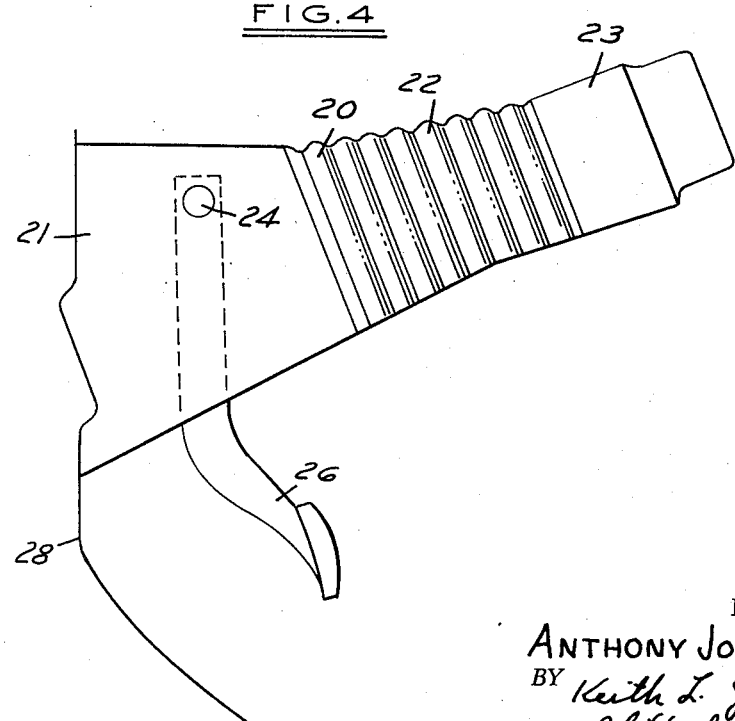
FIG. 4 is a side elevational view of a pedal and steering shaft support constructed in a manner similar to that of FIG. 3.

FIG. 4 shows a side elevational view of a slightly stylized version of the structure in FIG. 3. The FIG. 4 structure is functionally similar to that of FIG. 3.

Under an impact load against the steering wheel 31, the steering shaft 30 will collapse causing the rearward steering shaft section 23 to move forwardly toward the lower dash panel or fire wall 28. This movement will be permitted by the plastic deformation of the intermediate section 22. At the same time, the support bracket 29 will disengage from the upper dash or instrument panel. As the corrugated intermediate section 22 collapses under an impact load, energy will be absorbed. The illustrated structure has the advantage of being of low-cost construction and capable of absorbing impact loads over a fairly wide range of impact angles.

The foregoing description presents a presently preferred embodiment of this invention. Modifications and alterations may occur to those skilled in the art that will come within the scope and spirit of the following claims.

I claim:

1. A pedal and steering shaft support structure for a motor vehicle comprising a forward section, an intermediate section and a rearward section,
   a collapsible steering shaft supported by said rearward section,
   a steering wheel connected to said steering shaft,
   said intermediate section having energy absorbing means constructed to plastically deform under an impact load above a predetermined minimum value,
   said forward section having pivot means constructed to support at least one of the operating control pedals of said vehicle,
   said forward section being constructed to be connected to a portion of the body structure of said motor vehicle and said rearward section being constructed to be connected to another portion of the body structure of said motor vehicle.

2. A pedal and steering shaft support structure according to claim 1 and including:
   releasable means adapted to connect said rearward section to an instrument panel,
   said releasable means being constructed to release under an impact load above a preset minimum to permit the collapse of said intermediate section.

3. A pedal and steering shaft support structure according to claim 1 and including:
   said intermediate section comprises a sheet metal member having a generally channel-shape cross sectional configuration,
   said intermediate section having corrugated side walls and a corrugated top wall interconnecting said side walls.

4. A pedal and steering shaft support structure according to claim 1 and including:
   releasable means adapted to connect said rearward section to said other portion of said body structure,
   said releasable means being constructed to release under an impact load above a preset minimum to permit the collapse of said intermediate section,
   said intermediate section comprises a sheet metal member having a generally channel-shape cross sectional configuration, said intermediate section having corrugated side walls and a corrugated wall interconnecting said side walls.

5. A pedal and steering shaft support structure according to claim 1 and including:
said forward section and intermediate section comprises an integrally formed sheet metal member having a generally channel-shape cross sectional configuration,
said forward section and said intermediate section each having side walls and a wall interconnecting said side walls,
said walls of said intermediate section being corrugated.

6. A pedal and steering shaft support structure for a motor vehicle comprising a forward section,
an intermediate section and a rearward section,
a collapsible steering shaft supported by said rearward section,
a steering wheel connected to said steering shaft,
said intermediate section having energy absorbing means constructed to collapse under an impact load,
said forward section having pivot means constructed to support at least one of the operating control pedals of said vehicle,
said forward section being constructed to be connected to the dash panel of said motor vehicle and said rearward section being constructed to be connected to a portion of the instrument panel structure of said motor vehicle,
releasable means connecting said rearward section to said instrument panel structure,
said releasable means being constructed to release under an impact load above a preset minimum to permit the collapse of said intermediate section,
said forward section and intermediate section comprises an integrally formed sheet metal member having a generally channel-shape cross sectional configuration,
said forward section and said intermediate section each having side walls and a top wall interconnecting said side walls,
said walls of said intermediate section being corrugated,
said steering shaft being contained between said side walls.

7. A pedal and steering shaft support structure for a motor vehicle according to claim 6 and including:
said pivot means being supported by said side walls of said forward section,
an operating control pedal depending from said pivot means.

8. A steering shaft support structure for a motor vehicle comprising a forward section, an intermediate section and a rearward section,
said forward section being constructed to be rigidly connected to a body structure of said motor vehicle,
said rearward section being constructed to be releasably connected to a portion of the instrument panel structure of said motor vehicle,
said intermediate section comprises a sheet metal member having a generally channel-shape cross sectional configuration,
said intermediate section having a pair of generally vertically arranged side walls of corrugated construction,
a top wall of corrugated construction interconnecting the upper edges of said pair of side walls,
a collapsible steering shaft rotatably supported by said support structure,
said steering shaft being contained between said side walls,
the lower edges of said pair of side walls being spaced apart and in part defining an access opening exposing a portion of said steering shaft whereby said steering shaft may be inspected and repaired if necessary.

9. A steering shaft support structure for a motor vehicle comprising a forward section, an intermediate section and a rearward section,
said steering shaft support structure having a generally inverted channel-shape cross sectional configuration,
said forward section being constructed to be rigidly connected to a body structure of said motor vehicle,
a collapsible steering shaft rotataly supported by said rearward section of said support structure,
a steering wheel connected to the rearward end of said steering shaft,
said intermediate section being of lesser compressive strength than either said forward section or said rearward sections,
said intermediate section being constructed to collapse and plastically deform under an impact load above a predetermined minimum value against said steering wheel,
said intermediate section having a pair of generally vertically arranged side walls,
a top wall of generally horizontal construction interconnecting the upper edges of said pair of side walls,
said side walls and said top wall each having means defining plastically deformable energy absorbing portions of lesser strength than either said forward section or said rearward section,
the lower edges of said side walls being spaced apart and in part defining an access opening exposing a portion of said steering shaft whereby said steering shaft may be inspected and repaired if necessary.

10. The combination defined in claim 9 and including:
said rearward section of said steering shaft support structure being adapted to be releasably connected to a body panel structure of said motor vehicle.

11. The combination defined in claim 9 and including:
said intermediate section of said steering shaft support structure being formed of sheet metal and having transversely extending corrugations.

12. The combination defined in claim 10 and including:
said intermediate section of said steering shaft support structure being formed of sheet metal and having transversely extending corrugations.

* * * * *